(12) United States Patent
Raut et al.

(10) Patent No.: US 9,424,152 B1
(45) Date of Patent: Aug. 23, 2016

(54) TECHNIQUES FOR MANAGING A DISASTER RECOVERY FAILOVER POLICY

(71) Applicant: Veritas Technologies LLC, Mountain View, CA (US)

(72) Inventors: Yojana Narharrao Raut, Pune (IN); Praween Kumar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 111 days.

(21) Appl. No.: 13/654,114

(22) Filed: Oct. 17, 2012

(51) Int. Cl.
  *G06F 11/14* (2006.01)
  *G06F 11/20* (2006.01)

(52) U.S. Cl.
  CPC .................................. *G06F 11/2069* (2013.01)

(58) Field of Classification Search
  USPC ......................................................... 714/4.11
  See application file for complete search history.

(56) References Cited

U.S. PATENT DOCUMENTS

| | | | | |
|---|---|---|---|---|
| 7,555,674 | B1 * | 6/2009 | Wang | 714/15 |
| 8,055,933 | B2 * | 11/2011 | Jaehde et al. | 714/4.1 |
| 8,060,478 | B2 * | 11/2011 | Emaru et al. | 707/654 |
| 8,311,991 | B2 * | 11/2012 | Aggarwal et al. | 707/654 |
| 2002/0198996 | A1 * | 12/2002 | Sreenivasan et al. | 709/226 |
| 2007/0250738 | A1 * | 10/2007 | Phan | 714/6 |
| 2008/0120691 | A1 * | 5/2008 | Flewallen et al. | 726/1 |
| 2009/0024869 | A1 * | 1/2009 | Kitamura et al. | 714/4 |
| 2009/0271445 | A1 * | 10/2009 | Emaru et al. | 707/200 |
| 2009/0307522 | A1 * | 12/2009 | Olson et al. | 714/4 |
| 2010/0162036 | A1 * | 6/2010 | Linden et al. | 714/4 |
| 2011/0022882 | A1 * | 1/2011 | Jaehde et al. | 714/4 |
| 2011/0258481 | A1 * | 10/2011 | Kern | 714/4.1 |
| 2011/0264786 | A1 * | 10/2011 | Kedem et al. | 709/223 |
| 2012/0023209 | A1 * | 1/2012 | Fletcher et al. | 709/223 |
| 2012/0096149 | A1 * | 4/2012 | Sunkara et al. | 709/224 |
| 2012/0110164 | A1 * | 5/2012 | Frey et al. | 709/224 |
| 2012/0137173 | A1 * | 5/2012 | Burshan et al. | 714/15 |
| 2012/0151273 | A1 * | 6/2012 | Ben Or et al. | 714/41 |
| 2014/0122926 | A1 * | 5/2014 | Bartholomy et al. | 714/15 |
| 2014/0149791 | A1 * | 5/2014 | Goodman et al. | 714/15 |

* cited by examiner

*Primary Examiner* — Kamini Patel
(74) *Attorney, Agent, or Firm* — Wilmer Cutler Pickering Hale and Dorr LLP

(57) ABSTRACT

Techniques for managing a disaster recovery failover policy are disclosed. In one particular embodiment, the techniques may be realized as a method for managing a disaster recovery failover policy comprising identifying which of several disaster recovery sites are available for disaster recovery of host data, determining a configuration of each disaster recovery site identified, performing at least one test on each disaster recovery site identified, calculating a result from the at least one test performed on each disaster recovery site, and updating the disaster recovery failover policy based on the determined configuration and the calculated result.

20 Claims, 7 Drawing Sheets

TECHNIQUES FOR MANAGING A DISASTER RECOVERY FAILOVER POLICY

FIELD OF THE DISCLOSURE

The present disclosure relates generally to recovering data and failing over applications after a disaster and, more particularly, to techniques for managing a disaster recovery failover policy.

BACKGROUND OF THE DISCLOSURE

Disaster recovery of data from disaster recovery sites is very important for services that require a high level of availability. For example, a service level agreement (SLA) may specify a required recovery time objective (RTO) in the event of a failure or outage of databases, single applications, and complex multi-tiered applications across physical or virtual environments. Conventional disaster recovery configurations require a user to establish a disaster recovery configuration by specifying which disaster recovery site data will be replicated to. Further, in conventional multi-site disaster recovery configurations, the user is required to manually set a failover policy particularly, a priority order for failover, by analyzing available disaster recovery sites and selecting a best disaster recovery site. However, establishing a manual failover policy is time consuming for a user, and the best disaster recovery site may change over time.

In view of the foregoing, it may be understood that there may be significant problems and shortcomings associated with traditional disaster recovery site management technologies.

SUMMARY OF THE DISCLOSURE

Techniques for managing a disaster recovery failover policy are disclosed. In one particular embodiment, the techniques may be realized as a method for managing a disaster recovery failover policy comprising identifying which of several disaster recovery sites are available for disaster recovery of host data; determining a configuration of each disaster recovery site identified; performing at least one test on each disaster recovery site identified; calculating a result from the at least one test performed on each disaster recovery site; and updating the disaster recovery failover policy based on the determined configuration and the calculated result.

In accordance with other aspects of this particular embodiment, the disaster recovery failover policy specifies a priority order of each of the identified disaster recovery sites.

In accordance with further aspects of this particular embodiment, determining the configuration includes determining whether the plurality of disaster recovery sites are in a virtualized environment and determining whether the plurality of disaster recovery sites are in a clustered environment.

In accordance with additional aspects of this particular embodiment, when it is determined that the plurality of disaster recovery sites are in the virtualized environment, the at least one test includes determining whether a hypervisor is available and determining whether predetermined system resources of the disaster recovery site are available.

In accordance with additional aspects of this particular embodiment, one of the plurality of disaster recovery sites is connected to a host associated with the host data via a first network and synchronously replicates the host data from the host.

In accordance with additional aspects of this particular embodiment, one of the plurality of disaster recovery sites is connected to a host associated with the host data via a second network and asynchronously replicates the host data from the host.

In accordance with additional aspects of this particular embodiment, the host data includes a multi-tiered application.

In accordance with additional aspects of this particular embodiment, updating the disaster recovery failover policy based on the calculated result is performed independent of an input from a user of a host associated with the host data.

In accordance with additional aspects of this particular embodiment, the method may comprise determining, at a host associated with the host data, whether a predetermined interval has elapsed; and transmitting a request, from the host to each disaster recovery site identified, when it has been determined that the predetermined interval has elapsed such that the request instructs each disaster recovery site identified to perform the at least one test and to calculate the result.

In accordance with additional aspects of this particular embodiment, the method may comprise notifying a user of the host via a user interface when the disaster recovery failover policy has been updated.

In accordance with additional aspects of this particular embodiment, the method may comprise receiving, at each disaster recovery site, the request from the host; performing, at each disaster recovery site, the at least one test; calculating, at each disaster recovery site, the result based on the at least one test performed; transmitting, from each disaster recovery site to the host, the calculated result; receiving, at the host, the calculated result from each disaster recovery site; comparing, at the host, the calculated results received from each of the disaster recovery sites; updating, at the host, the disaster recovery failover policy based on the comparison; and storing, at the host, the updated disaster recovery failover policy in a storage unit, such that each disaster recovery site is further configured to transmit, to the host, an indication that the at least one test failed when the performance of the at least one test was unsuccessful.

In accordance with additional aspects of this particular embodiment, the method may comprise retrieving from a storage unit, at each disaster recovery site upon receipt of the request, a preset list specifying the at least one test, the preset list including at least one first test; performing, at each disaster recovery site, the at least one first test; and calculating, at each disaster recovery site, a first value from the at least one first test performed such that the calculated result transmitted from each disaster recovery site is based on the first value calculated at the respective disaster recovery site.

In accordance with additional aspects of this particular embodiment, the preset list includes a plurality of first tests and each disaster recovery site performs the plurality of first tests according to a first predetermined order.

In accordance with additional aspects of this particular embodiment, the plurality of first tests include at least one of determining connectivity of a storage unit of the disaster recovery site, determining consistency of data stored in the storage unit at the disaster recovery site, determining whether the data stored in the storage unit at the disaster recovery site is current, and determining an overall health of the disaster recovery site, the overall health including resource availability.

In accordance with additional aspects of this particular embodiment, the method may comprise determining, at each disaster recovery site, whether the preset list further includes at least one second test; performing, at each disaster recovery site, the at least one second test when it is determined that the preset list includes the at least one second test; and calculating, at each disaster recovery site, a second value from each second test performed such that the calculated result is modified based on the second value calculated.

In accordance with additional aspects of this particular embodiment, the result is calculated by weighting each first value.

In accordance with additional aspects of this particular embodiment, the preset list includes a plurality of second tests and each disaster recovery site performs the plurality of second tests according to a second predetermined order.

In accordance with additional aspects of this particular embodiment, the plurality of second tests are set by the user via a user interface at each of the disaster recovery sites.

In another particular embodiment, the techniques may be realized as least one non-transitory processor readable storage medium storing a computer program of instructions configured to be readable by at least one processor for instructing the at least one processor to execute a computer process for performing the method for managing a disaster recovery failover policy comprising identifying which of several disaster recovery sites are available for disaster recovery of host data; determining a configuration of each disaster recovery site identified; performing at least one test on each disaster recovery site identified; calculating a result from the at least one test performed on each disaster recovery site; and updating the disaster recovery failover policy based on the determined configuration and the calculated result.

In another particular embodiment, the techniques may be realized as a system for managing a disaster recovery failover policy comprising one or more processors communicatively coupled to a network; wherein the one or more processors are configured to: identify which of a plurality of disaster recovery sites are available for disaster recovery of host data; determine a configuration of each disaster recovery site identified; perform at least one test on each disaster recovery site identified; calculate a result from the at least one test performed on each disaster recovery site; and update the disaster recovery failover policy based on the determined configuration and the calculated result.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
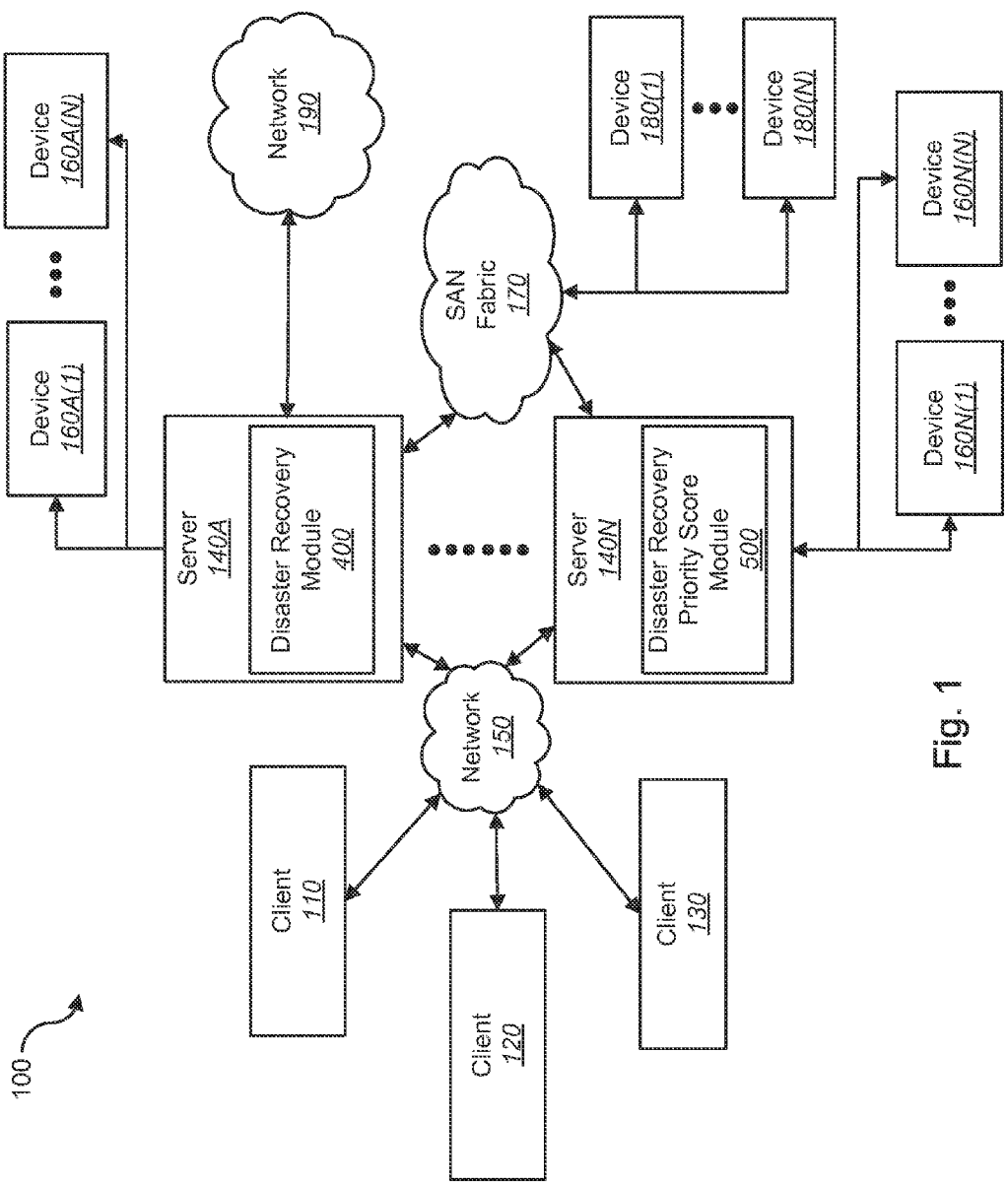
FIG. 1 shows a block diagram depicting a network architecture in accordance with an embodiment of the present disclosure.

FIG. 1 shows a block diagram depicting a network architecture for disaster recovery site management in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140N may be communicatively coupled to storage devices 160N(1)-(N). Servers 140A-140N may contain a management module (e.g., disaster recovery site management module 400 T server 140A and disaster recovery site priority score calculation module 500 T server 140N). Servers 140A-140N may be communicatively coupled to a SAN (Storage Area Network) fabric 170. SAN fabric 170 may support access to storage devices 180(1)-(N) by servers 140A-140N, and by client systems 110, 120 and 130 via network 150.

Figure 2:
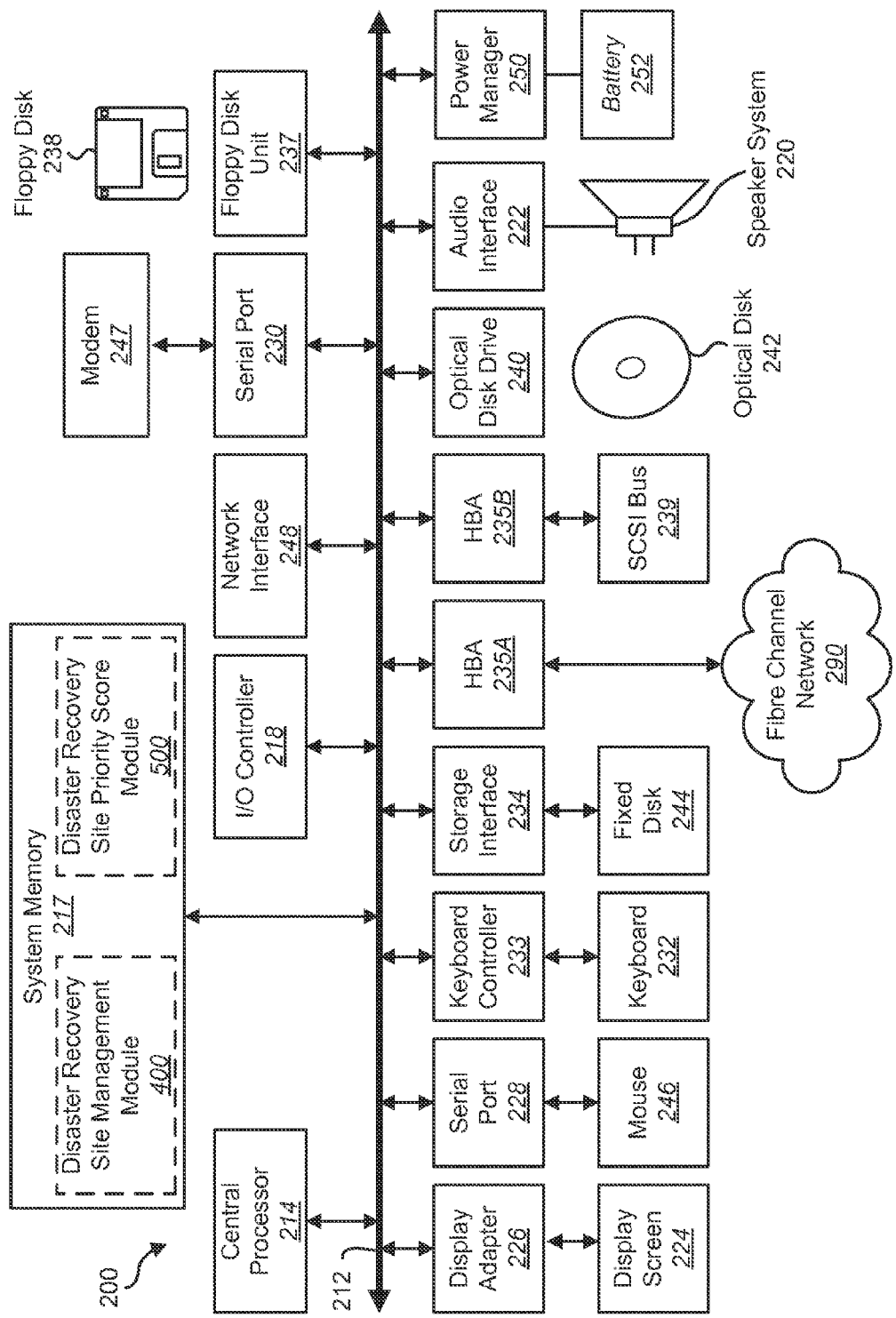
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A-140N using, for example, a web browser or other client software (not shown). Such a client may allow client systems 110, 120 and 130 to access data hosted by any one of servers 140A-140N or one of storage devices 160A(1)-(N), 160N(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160N(1)-(N), and/or 180(1)-(N) may be network accessible storage and may be local, remote, or a combination thereof to any one of servers 140A-140N. Storage devices 160A(1)-(N), 160N(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160N(1)-(N), and/or 180(1)-(N) may be used for backup or archival purposes. For example, storage devices 160N(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A-140N may be application servers, archival platforms, backup servers, network storage devices, media servers, email servers, document management platforms, enterprise search servers, or other devices communicatively coupled to network 150. Servers 140A-140N may utilize one of storage devices 160A(1)-(N), 160N(1)-(N), and/or 180(1)-(N) for the storage of application data, backup data, or other data. Servers 140A-140N may be hosts, such as an application server, which may process data traveling between clients 110, 120, and 130 and a backup platform, a backup process, and/or storage. According to some embodiments, servers 140A-140N may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy.

According to some embodiments, server 140A may contain one or more portions of software for disaster recovery site management such as, for example, disaster recovery site management module 400. As illustrated, one or more portions of the disaster recovery module disaster recovery site management module 400 may reside at a network centric location. For example, server 140A may be a server, a firewall, a gateway, or other network element that may perform one or more actions to determine disaster recovery priorities. According to some embodiments, network 190 may be an external network (e.g., the Internet) and server 140A may be a gateway or firewall between one or more internal components and clients and the external network. According to some embodiments, disaster recovery site management module 400 may be implemented as part of a cloud computing environment.

Further, according to some embodiments, multiple servers 140B-140N may contain one or more portions of software for disaster recovery site priority score calculation such as, for example, disaster recovery site priority score calculation module 500. As illustrated, one or more portions of the disaster recovery site priority score calculation module 500 may reside at a network centric location. For example, server 140N may be a server, a firewall, a gateway, or other network element that may perform one or more actions to calculate disaster recovery priority scores. According to some embodiments, network 190 may be an external network (e.g., the Internet) and server 140N may be a gateway or firewall between one or more internal components and clients and the external network. According to some embodiments, the disaster recovery site priority score calculation module 500 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, disaster recovery site management module 400 or disaster recovery priority score module 500 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
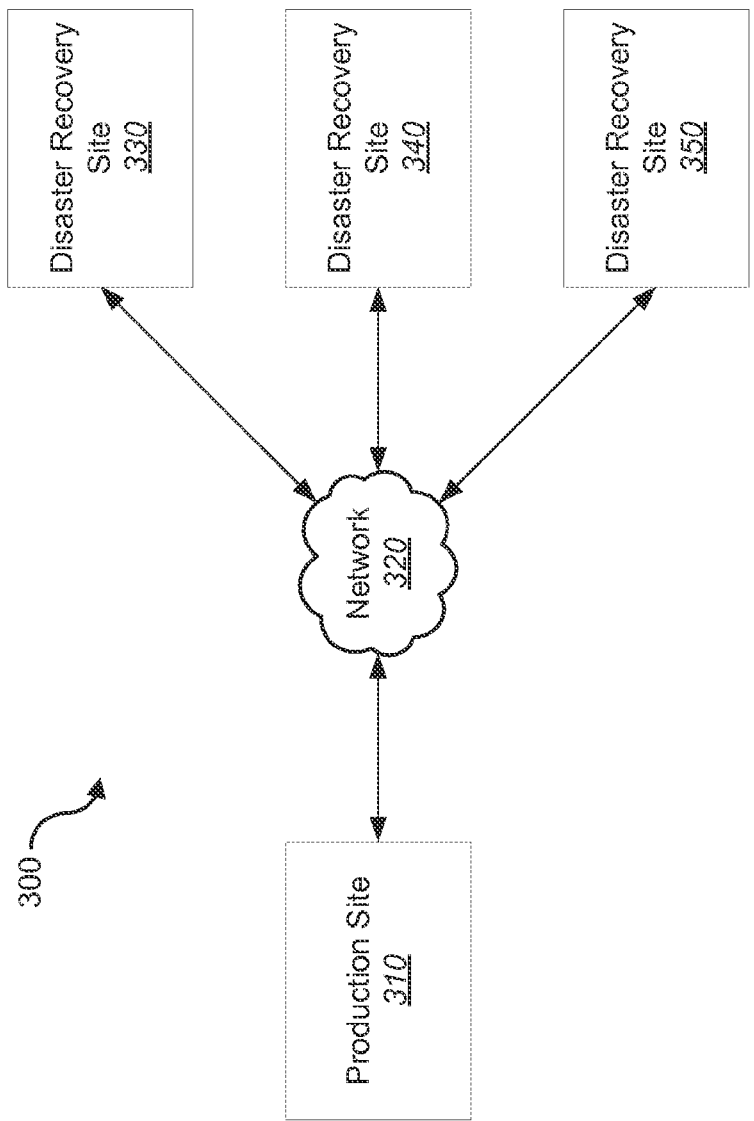
FIG. 3 shows a block diagram depicting a multi-site disaster recovery network topology in accordance with an embodiment of the present disclosure.

FIG. 3 shows a multi-site disaster recovery network topology in accordance with an embodiment of the present disclosure. FIG. 3 is a simplified view of the multi-site disaster recovery network topology 300, which may include additional elements that are not depicted. Multi-site disaster recovery network topology 300 may include a production site 310, as a host, and disaster recovery sites 330, 340, and 350. As illustrated, the production site 310 may be communicatively coupled to the disaster recovery sites 330, 340, and 350 via a network 320. The multi-site disaster recovery network topology may be configured according to Veritas Cluster Server (VCS) Replicated Data Clusters (RDC) or Global Cluster Option (GCO), or any other suitable network configuration.

According to some embodiments, the production site 310 may be server 140A and the disaster recovery sites 330, 340, and 350 may be any one of servers 140B-140N. The production site 310 may host a single tier application or multi-tier applications that are made available to users via server clustering such as the Replicated Data Clusters or the Global Cluster Option. Each of the disaster recovery sites 330, 340, and 350 may provide failover for the single tier application or the multi-tier applications at the production site 310. In the multi-tiered application environment (e.g., a web tier, an application tier, and a database tier), the disaster recovery sites 330, 340, and 350 may replicate data of at least one tier (e.g., the database tier) for failover.

According to some embodiments, each of the disaster recovery sites 330, 340, and 350 may be arranged locally or at a geographic distance from the production site 310 according to the clustering configuration. Further, each of the disaster recovery sites 330, 340, and 350 may provide synchronous or asynchronous replication of data (e.g., application data or virtual machine boot images) of the single tier application or the multi-tier applications from the production site 310. For example, Replicated Data Clusters may provide failover for the production site 310 and may include a single cluster having two sites providing synchronous replication of data from the production site 310. Further, the Global Cluster Option may provide wide area failover for the production site 310 and may include two distinct clusters providing asynchronous replication of data from the production site 310. Additionally, the disaster recovery sites 330, 340, and 350 may provide synchronous or asynchronous replication of the data of the production site 310 according to the geographic distance from the production site 310. In other embodiments, the disaster recovery sites 330, 340, and 350 may be configured according to a virtualized environment.

The description below describes network elements, computers, and/or components of a system and method for disaster recovery that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 4:
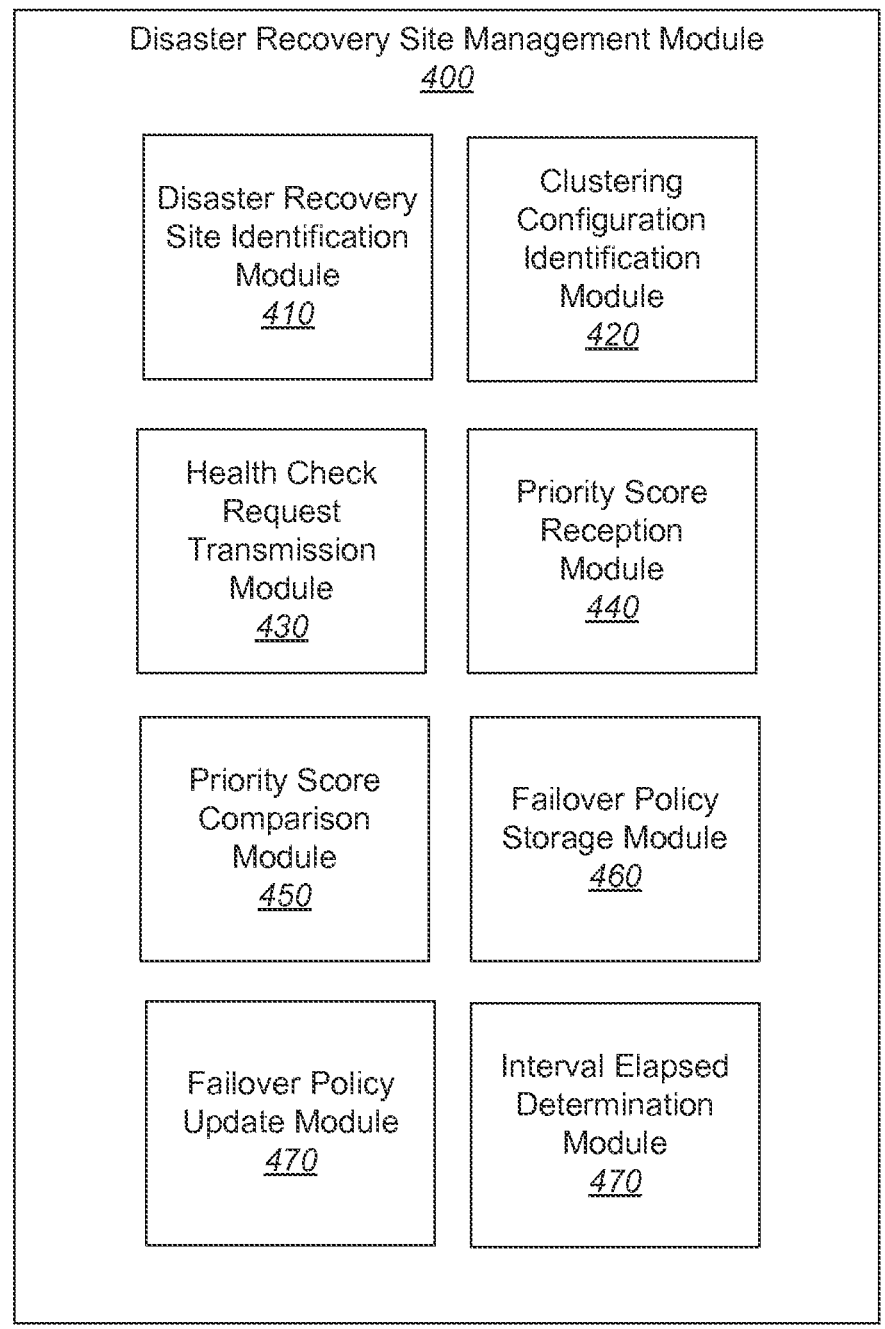
FIG. 4 shows a disaster recovery site management module in accordance with an embodiment of the present disclosure.

FIG. 4 shows a disaster recovery site management module 400 in accordance with an embodiment of the present disclosure. As illustrated, the disaster recovery site management module 400 may contain one or more components including a disaster recovery site identification module 410, a clustering configuration identification module 420, a health check request transmission module 430, a priority score reception module 440, a priority score comparison module 450, a failover policy storage module 460, a failover policy update module 470, and an interval elapsed determination module 480. In some embodiments, the disaster recovery site management module 400 may be arranged within the production site 310.

The disaster recovery site identification module 410 may identify which of the disaster recovery sites 330, 340, and 350 are presently available for disaster recovery. For example, the disaster recovery site identification module 410 of the production site 310 may identify which of the disaster recovery sites 330, 340, and 350 are presently in communication with the production site 310 and available for disaster recovery by monitoring a previously established connection. In some embodiments, the disaster recovery site identification module 410 may monitor a heartbeat of the disaster recovery sites 330, 340, and 350.

The clustering configuration identification module 420 may determine how the available disaster recovery sites are clustered and may determine a clustering environment or topology of the available disaster recovery sites. In some embodiments, the clustering configuration identification module 420 may determine that the production site 310 and the disaster recovery sites production site 310 are configured according to the Replicated Data Cluster configuration, the Global Cluster Option configuration, or another clustering configuration. Further, the clustering configuration identification module 420 may determine that the production site 310 and the disaster recovery sites 330-350 are configured according to a virtualized environment.

The health check request transmission module 430 may transmit a health check request to each of the disaster recovery sites identified by the disaster recovery site identification module 410. For example, the health check request may include instructions which cause the disaster recovery sites to perform a process to check the health of the respective disaster site.

The priority score reception module 440 may receive a priority score from each disaster recovery site. In some embodiments, the priority score reception module 440 may receive a priority score calculated at each disaster recovery site to which the health check request was transmitted to by the health check request transmission module 430. In addition, the priority score reception module 440 may cause the received priority scores to be stored locally at the production site 310. Further, in some embodiments, the priority score reception module 440 may receive information from the disaster recovery sites indicating whether a health check performed at the respective disaster recovery site has failed such that a user may identify a problem at the disaster recovery site and take appropriate action.

The priority score comparison module 450 may compare each of the received priority scores from the disaster recovery sites to determine a rank and priority order of the disaster recovery sites. For example, when priority scores have been received from three disaster recovery sites, the priority score comparison module 450 may determine which disaster recovery site has a highest priority score, which disaster recovery site has an intermediate priority score, and which disaster recovery site has a lowest priority score. The priority score comparison module 450 may then rank the disaster recovery sites according to the compared scores and store the result locally. For example, the disaster recovery sites may be ranked in a descending order such that the disaster recovery site with the highest priority score is ranked first, the disaster recovery site with the intermediate priority score is ranked second, and the disaster recovery site with the lowest priority score is ranked third.

The failover policy storage module 460 may store a predefined or initial failover policy. The predefined or initial failover policy may be specified by a user upon an initial establishment of the multi-site disaster recovery network topology. For example, the initial failover policy across the disaster recovery sites 330, 340, and 350 may specify automatic failover in a priority order of: 1.) disaster recovery site 330, 2.) disaster recovery site 340, and 3.) disaster recovery site 350. Accordingly, if an event occurs at the production site 310, then failover may proceed according to the failover policy. For example, upon failure of a service (e.g., an application) at the production site 310, the production site 310 may failover to disaster recovery site 330 if disaster recovery site 330 is available, to disaster recovery site 340 if disaster recovery site 330 is not available, or disaster recovery site 350 if disaster recovery site 330 and 340 are not available.

The failover policy update module 470 may update or modify the initial failover policy according to the comparison of the received priority scores performed by the priority score comparison module 450. In some embodiments, the failover policy update module 470 may also modify the initial failover policy based on the identification of which disaster recovery sites are available by the disaster recovery site identification module 410 and the clustering configuration determined by the clustering configuration identification module 420.

The interval elapsed determination module 480 may determine whether a disaster recovery health check interval has elapsed and inform the health check request transmission module 430 of the result. The disaster recovery health check interval may be a predefined time interval or may be specified by a user via a user interface. For example, the time interval may be a day, a week, or any other user defined period of time.

Figure 5:
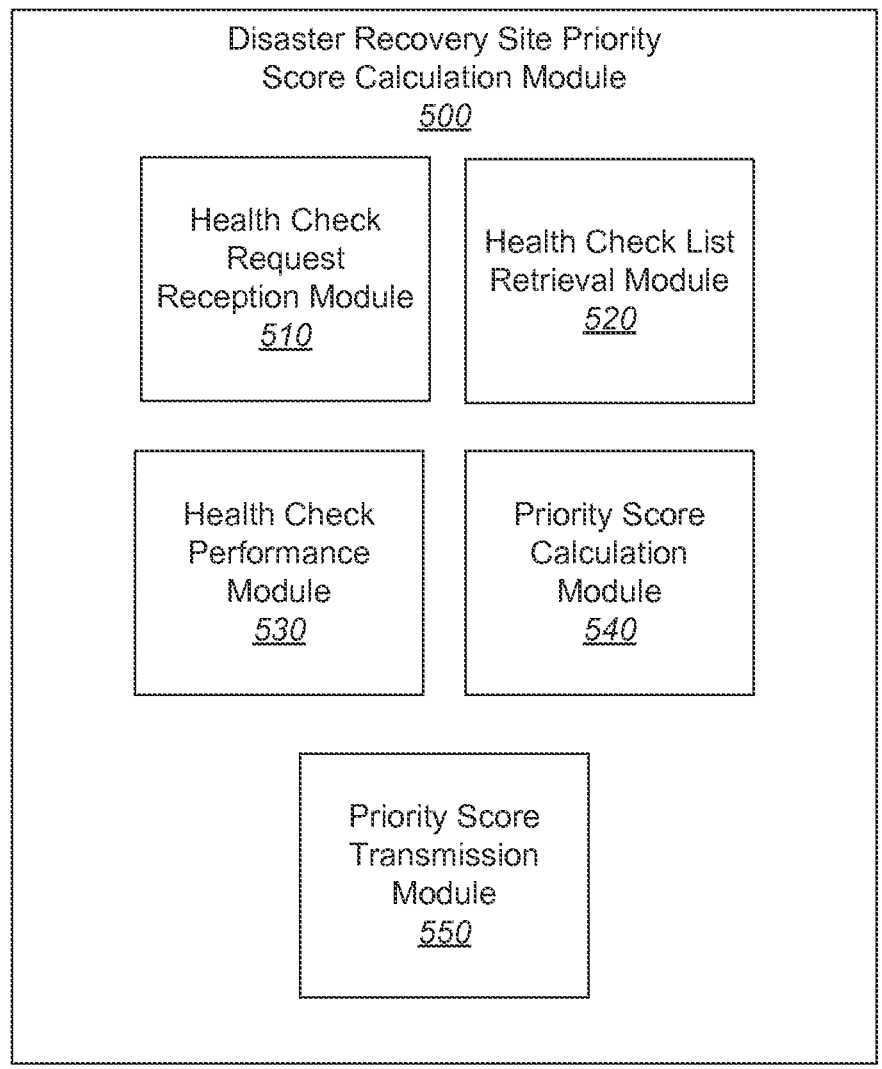
FIG. 5 shows a disaster recovery site priority score calculation module in accordance with an embodiment of the present disclosure.

FIG. 5 shows a disaster recovery site priority score calculation module 500 in accordance with an embodiment of the present disclosure. As illustrated, the disaster recovery site priority score calculation module 500 may contain one or more components including a health check request reception module 510, a health check list retrieval module 520, a health check performance module 530, a priority score calculation module 540, and a priority score transmission module 550. In some embodiments, the disaster recovery site priority score calculation module 500 may be arranged within each of the disaster recovery sites 330-350.

The health check request reception module 510 may receive a request to perform a health check of the disaster recovery site. In some embodiments, the health check request reception module 510 may receive the request from the health check request transmission module 430 of the production site 310 via the network 320.

The health check list retrieval module 520 may retrieve a list of health checks stored locally at the disaster recovery site.

In some embodiments, the list of health checks may be prestored at each disaster recovery site. Upon receipt of the health check request, the health check request reception module 510 may instruct the health check list retrieval module 520 to retrieve the list of locally stored health checks. In some embodiments, the list of health checks may include a plurality of preset health checks and a plurality of user defined health check criteria.

The plurality of preset health checks may include disaster recovery site state checks and application health checks. For example, a first check may specify a check of a connectivity state of the disaster recovery site. For example, the first check may include a check of network connectivity of the disaster recovery site including a check of a surface area network (SAN) connectivity and a check of storage connectivity (e.g., a network attached storage (NAS)) to at least one host (e.g., the production site 310) at the disaster recovery site. The check of the storage connectivity may be performed using virtual machine level commands such as listing of disks. A second check may include a check of the consistency of data replicated from the host (e.g., the production site 310) to the disaster recovery site. The state of the replicated data may be determined by utilizing vendor provided command line interface (CLI) tools. A third check may include a check of how current or how up to date the replicated data stored at the disaster recovery site is. A fourth check may be a check of the overall system health of the disaster recovery site. For virtualized environments, the check of the overall system health may include a check of the availability of the hypervisor or virtual machine manager (VMM). Further, for multi-tiered applications, a fifth check may include a check of the overall system health such as the system availability for applications in other tiers and whether their configurations are proper.

The plurality of preset health checks may further include a sixth check which is a check of the network connectivity for applications at the disaster recovery site. For example, the sixth check may determine whether the applications are capable of communicating with clients and other dependents. Additionally, a seventh check may include a check of a state of replication. For example, the state of replication may indicate whether a link was broken or suspended during the replication of data from the production site to the disaster recovery site. In other embodiments, the list of preset health checks may include additional health checks depending upon the clustering environment.

Further, a user may modify the list of health checks to include a plurality of user defined health checks to be performed via a user interface at each disaster recovery site. For example, a user may modify the plurality of user defined health checks to include a check to determine, when the disaster recovery site is a single or multi-tiered application utilizing Microsoft Exchange, an ability of the disaster recovery site to connect to a Microsoft Active Directory server. In some embodiments, each disaster recovery site may include different health checks that may be either preset and/or user defined. In other embodiments, the user defined health checks may include a check of the availability of specific resources of the disaster recovery site such as an availability of a central processing unit (CPU), availability of memory, and availability of any other hardware or software resource. In addition, the user defined health checks may also include a check of loads on the disaster recovery site such as a check of a load on the CPU, a check of a load on the memory, a check of a load on network resources, and checks on loads on any other hardware or software resources. The check of the loads on the disaster recovery site may be a check of loads for a particular application to determine if the disaster recover site has a load capacity for the application.

The health check performance module 530 may perform the health checks according to the list of health checks retrieved by the health check list retrieval module 520. Additionally, the health check performance module 530 may perform the health checks in a predefined order. In some embodiments, the health checks may be performed at a service group level or at a Virtual Business Service (VBS) level at each disaster recovery site. Further, the health check performance module 530 may first perform the plurality of preset health checks and secondly perform the plurality of user defined health checks. Additionally, a user may modify the order in which the health checks are to be performed via a user interface.

The priority score calculation module 540 may calculate a priority score based on the health checks performed by the health check performance module 530. For example, each health check performed may return a value to be added to the priority score. In some embodiments, the priority score calculation module 540 may calculate an initial priority score based on the results of the plurality of preset health checks. The priority score calculation module 540 may then add to the initially priority score based on the results of the plurality of user defined health checks performed. The priority score calculation module 540 may also apply a weight to a certain value or different weights to different values resulting from the health checks. For example, each of the values from the plurality of preset health checks may be weighted. Accordingly, the results of the plurality of preset health checks may influence the priority score calculated by the priority score calculation module 540 more than the results of the plurality of user defined health checks due to the weighting.

The priority score transmission module 550 may transmit the priority score calculated by the priority score calculation module 540. For example, upon completion of all of the preset health checks and the user defined health checks, and the calculation of the updated priority score, the priority score transmission module 550 of the disaster recovery site (e.g., disaster recovery site 330, 340, or 350) may transmit its priority score to the priority score reception module 440 of the production site 310 via the network 320.

The failover policy update module 470, as illustrated in FIG. 4, may update or modify the initial failover policy based on the priority score received from the priority score transmission module 550. In some embodiments, for example the Virtual Business Service, the failover policy update module 470 may initially determine a priority order based on the results of the fourth check, the fifth check, and the sixth check for all of the tiers in a multi-tiered application. Subsequently, the failover policy update module 470 may identify service groups which are replicating data and determine the priority order based on the results of the first check, the second check, the third check, and the seventh check. Further, in some embodiments, the priority score transmission module 550 may transmit information to the production site indicating that a health check has failed.

Figure 6:
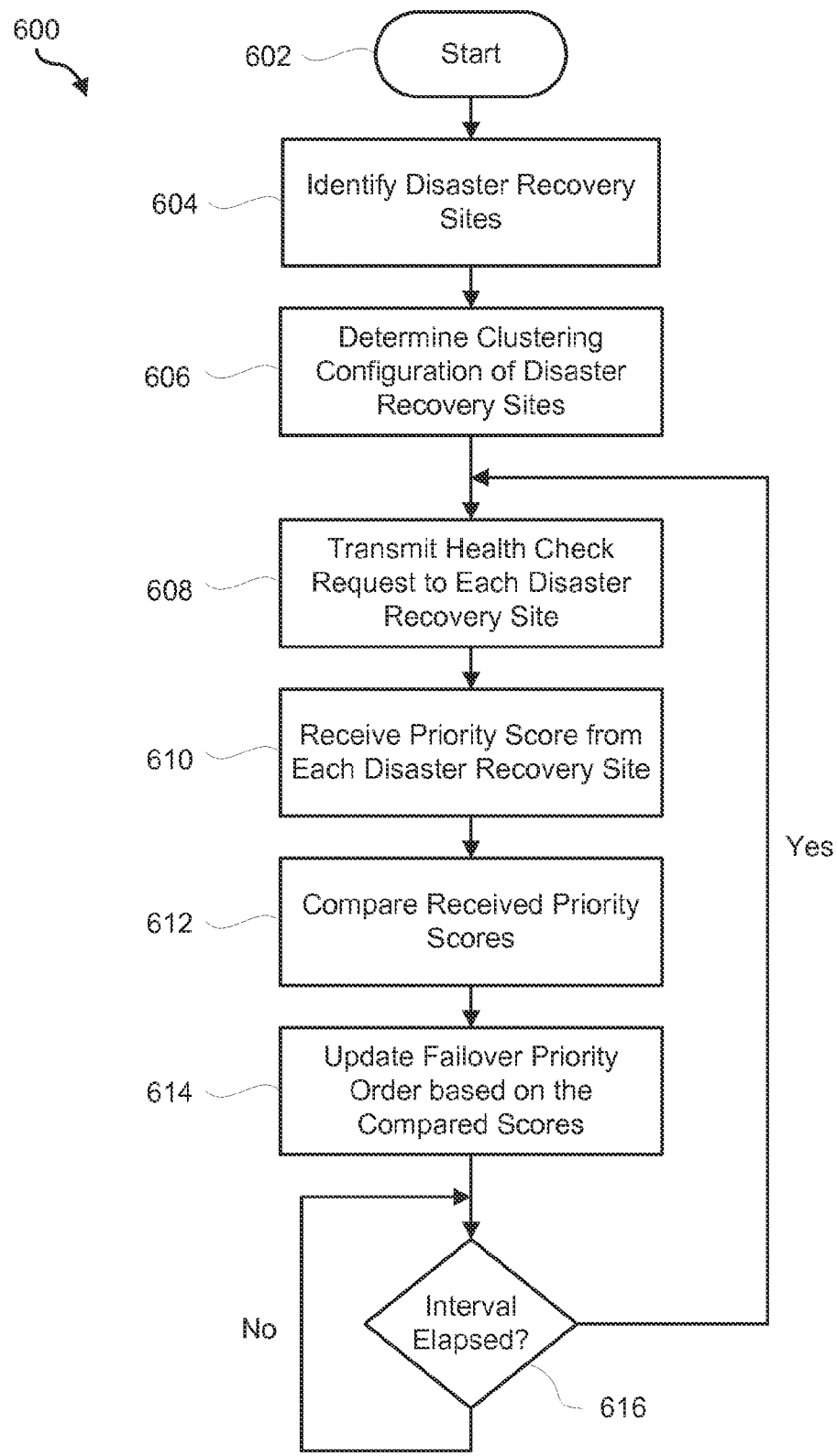
FIG. 6 shows a method for managing a disaster recovery site priority order in accordance with an embodiment of the present disclosure.

FIG. 6 shows a method 600 for managing a disaster recovery site priority order in accordance with an embodiment of the present disclosure. At block 602, the method 600 may begin.

At block 604, disaster recovery sites that are available for disaster recovery or failover may be identified. For example, the production site 310 may identify which of the disaster recovery sites 330-350 are presently available for disaster recovery. In some embodiments, the production site 310 may identify which of the disaster recovery sites 330-350 are presently available based on monitoring of a heartbeat of the disaster recovery sites 330-350.

At block 606, clustering configurations of the identified disaster recovery sites (e.g., disaster recovery sites 330-350) may be determined. For example, the production site 310 may determine that the disaster recovery sites 330-350 are in the Replicated Data Cluster configuration, the Global Cluster Option configuration, or another clustering configuration. The process then proceeds to block 608.

At block 608, a health check request may be transmitted to each of the disaster recovery sites identified in block 604. For example, the health check request transmission module 430 of the production site 310 may transmit the health check request to each of the disaster recovery sites 330-350 via the network 320. The health check request may be transmitted concurrently or sequentially to each of the disaster recovery sites. After transmission of the health check requests to the disaster recovery sites 330-350, the process proceeds to block 610. The health check request may include instructions informing the disaster recovery site to initiate performance of disaster recovery site health checks.

At block 610, a priority score may be received from each of the disaster recovery sites that the health check request was transmitted to in block 608. For example, the production site 310 may receive a priority score from each of the disaster recovery sites 330-350. In some embodiments, the production site 310 may await the reception of a priority score from each of the disaster recovery sites 330-350 to which the health check request was transmitted to in block 608 before proceeding to block 612. The production site may locally store the received priority scores.

At block 612, the priority scores received from the disaster recovery sites may be compared. In some embodiments, the production site 310 may compare each of the priority scores received from the disaster recovery sites 330-350 to determine which disaster recovery site 330, 340, or 350 has a highest score, which disaster recovery site 330, 340, or 350 has an intermediate score, and which disaster recovery site 330, 340, or 350 has a lowest score. The production site 310 may then rank the disaster recovery sites according to the compared scores. At block 614, the failover priority order of the disaster recovery sites included in the failover policy for the production site may be updated according to the comparison of the received scores performed at block 612. Further, the failover priority order may be updated according to the identification of which production sites are available for disaster recovery or failover from block 604 and according to the determination of the clustering configuration from block 606.

In some embodiments, the production site 310 may update the failover priority order of the disaster recovery sites 330-350 specified in the failover policy, which is stored locally at the production site 310, to remove a disaster recover site (e.g., disaster recovery site 330) if it is determined that that disaster recovery site (e.g., disaster recovery site 330) is not identified as available at block 604. In one example, if the production site 310 determines that each of the disaster recovery sites 330-350 are available, that the disaster recovery site 350 has the highest score, that the disaster recovery site 330 has the lowest score, and that disaster recovery site 340 has the intermediate score, the previously stored priority order may be updated to: 1.) disaster recovery site 350, 2.) disaster recovery site 340, and 3.) disaster recovery site 330. Accordingly, if a predetermined failure event occurs at the production site 310 after updating the failover policy, failover may occur in the order of 1.) disaster recovery site 350, 2.) disaster recovery site 340, and 3.) disaster recovery site 330.

In some embodiments, a user may be notified of the update to the failover priority order of the disaster recovery sites 330-350 specified in the failover policy. In particular, a user of the production site 310 may be notified via a user interface of the changes to the failover policy. At any time, the user may manually modify the failover priority order of the disaster recovery sites in the failover policy. For example, a user may modify the priority order to specify an order or priority different from the priority order which has been modified at block 614.

At block 616, a determination of whether a disaster recovery health check interval has elapsed is performed. The disaster recovery health check interval may be a predefined time interval or may be specified by a user via a user interface. When it is determined that the disaster recovery health check interval has not elapsed (No), the process repeats the determination at block 616. When it is determined that the disaster recovery health check interval has elapsed (Yes), the process proceeds to block 608 and the process is again performed as described above.

In some embodiments, the production site 310 may perform the method 600 for managing the disaster recovery site priority order without input or approval from a user. Further, a user may terminate the method 600 such that the failover policy will not be updated.

Figure 7:
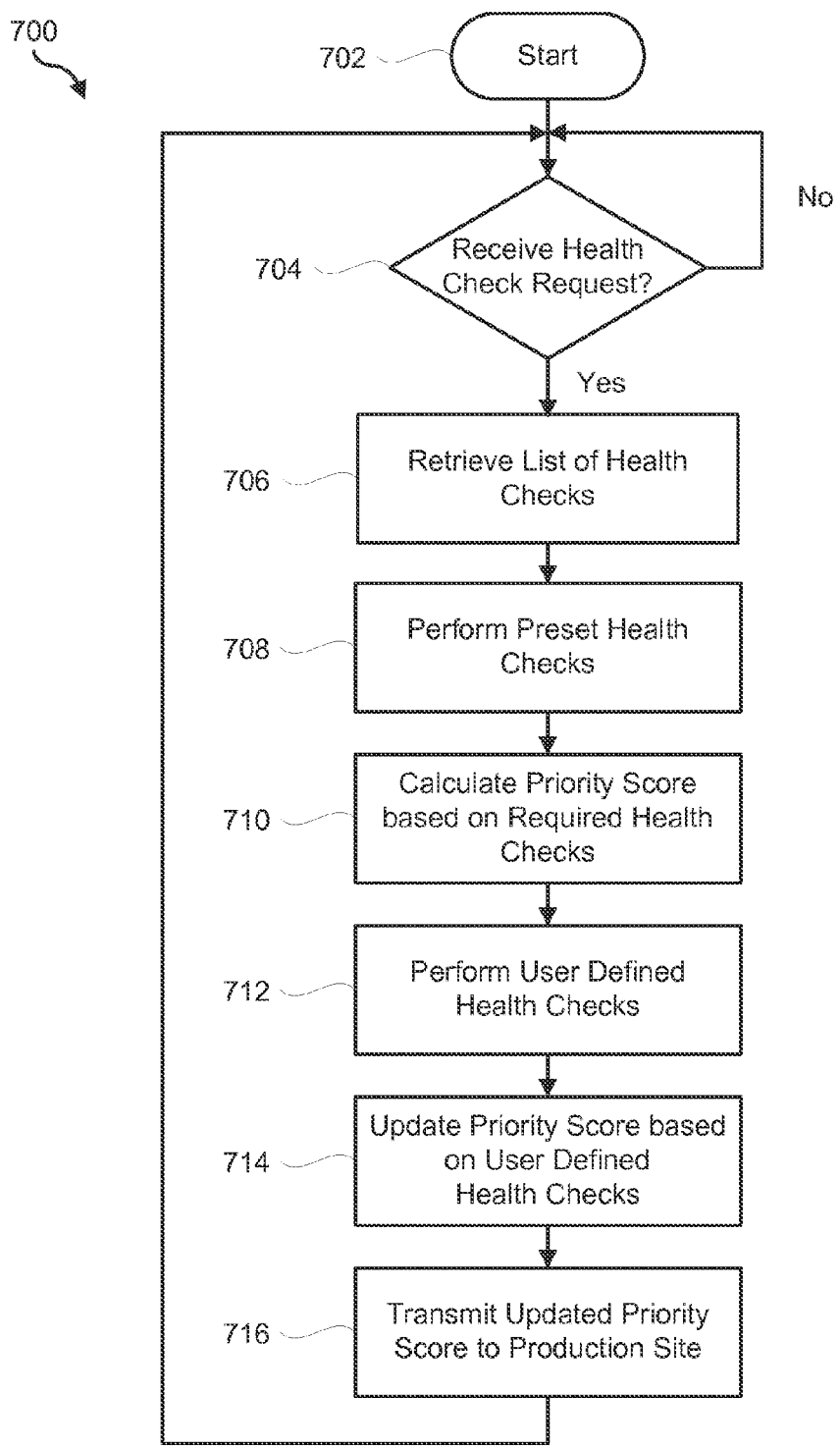
FIG. 7 shows a method for calculating a priority score for a disaster recovery site in accordance with an embodiment of the present disclosure.

FIG. 7 shows a method 700 for calculating a priority score for a disaster recovery site in accordance with an embodiment of the present disclosure. In some embodiments, the method 700 is performed simultaneously or concurrently at each of the disaster recovery sites. For example, each of the subsequent steps or blocks included in the method 700 may be performed at each of the disaster recovery sites 330-350 independently. At block 702, the method 700 may begin.

At block 704, it is determined whether a health check request has been received at a disaster recovery site. For example, disaster recovery site 330 may determine whether a health check request has been received from the production site 310 via the network 320.

At block 706, a list of health checks may be retrieved. In some embodiments, each of the disaster recovery sites 330-350 performing method 700 may retrieve the list of health checks stored locally at each respective disaster recovery site 330-350. The list of health checks may include preset health checks and user defined health checks as described above. The user defined health checks may be specified by the user via a user interface at the respective disaster recovery site 330, 340, or 350.

At block 708, the disaster recovery site may perform the preset disaster recovery health checks specified by the list of health checks retrieved at block 706. The disaster recovery health checks may be performed in a predefined order. The process then proceeds to block 710.

At block 710, the disaster recovery site may calculate a disaster recovery site priority score based on the results of the preset health checks performed at block 708. In some embodiments, each health check may be performed in a specified order to return a value which is weighted and added to calculate the priority score as described above. The amount of weight applied to particular health checks may be varied to emphasize particular checks.

At block 712, the disaster recovery site may perform the user defined health checks specified by the list of health checks retrieved at block 706. In some embodiments, the process may proceed to block 714 when the list of health checks stored at the disaster site does not include any user defined health checks. In other embodiments, the disaster recovery site may perform the user defined health checks in a predefined order.

At block 714, the disaster recovery site may update its respective disaster recovery site priority score accordingly to the user defined health checks performed at block 712. In some embodiments, the value resulting from each of the user defined health checks is added to the priority score calculated at block 710 with or without weighting.

At block 716, the disaster recovery site may transmit the disaster recovery site priority score calculated at block 714 to the production site. For example, the disaster recovery site 330 may transmit its calculated priority score to the production site 310 via the network 320. After transmitting the disaster recovery site priority score, the disaster recovery site may await the receipt of a subsequent health check request from the production site such that upon receipt of the health check request, process 700 may be repeated.

At this point it should be noted that disaster recovery site management in accordance with the present disclosure as described above may involve the processing of input data and the generation of output data to some extent. This input data processing and output data generation may be implemented in hardware or software. For example, specific electronic components may be employed in a disaster recovery site management or similar or related circuitry for implementing the functions associated with disaster recovery in accordance with the present disclosure as described above. Alternatively, one or more processors operating in accordance with instructions may implement the functions associated with disaster recovery site management in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing a disaster recovery failover policy comprising the steps of:
   identifying which of a plurality of disaster recovery sites are available for disaster recovery of host data;
   determining a cluster configuration of each disaster recovery site identified as available for the disaster recovery of the host data independent of initiation of the disaster recovery of the host data;
   performing a plurality of tests on each disaster recovery site identified independent of the initiation of the disaster recovery of the host data;

determining, at each disaster recovery site, whether one of the plurality of tests was unsuccessful;
calculating, at each disaster recovery site, a priority score based on the plurality of tests performed on each disaster recovery site;
transmitting, from each disaster recovery site to a separate host, the priority score and, when it has been determined that the one of the tests was unsuccessful, an indication that the one of the plurality of tests was unsuccessful;
comparing, at the host, the priority score received from each disaster recovery site;
ranking, at the host, each of the disaster recovery sites based on the comparison of the priority scores; and
updating automatically, at the host, the disaster recovery failover policy based on the identification of which of the plurality of disaster recovery sites are available for disaster recovery, the determined cluster configuration, and the ranking prior to a failover event occurring at the host.

2. The method of claim 1, wherein the disaster recovery failover policy specifies a priority order of each of the identified disaster recovery sites.

3. The method of claim 1, wherein determining the configuration includes determining whether the plurality of disaster recovery sites are in a virtualized environment.

4. The method of claim 3, wherein when it is determined that the plurality of disaster recovery sites are in the virtualized environment, the at least one test includes determining whether a hypervisor is available and determining whether predetermined system resources of the disaster recovery site are available.

5. The method of claim 1, wherein one of the plurality of disaster recovery sites is connected to the host associated with the host data via a first network and synchronously replicates the host data from the host.

6. The method of claim 1, wherein one of the plurality of disaster recovery sites is connected to the host associated with the host data via a second network and asynchronously replicates the host data from the host.

7. The method of claim 1, wherein the host data includes a multi-tiered application.

8. The method of claim 1, wherein updating the disaster recovery failover policy based on the calculated result is performed independent of an input from a user of the host associated with the host data.

9. The method of claim 1, further comprising:
determining, at the host associated with the host data, whether a predetermined interval has elapsed; and
transmitting a request, from the host to each disaster recovery site identified, when it has been determined that the predetermined interval has elapsed,
wherein the request instructs each disaster recovery site identified to perform the plurality of tests and to calculate the priority score.

10. The method of claim 9, further comprising:
notifying a user of the host via a user interface when the disaster recovery failover policy has been updated.

11. The method of claim 9, further comprising:
receiving, at each disaster recovery site, the request from the host;
transmitting, from each disaster recovery site to the host, the calculated priority score; and
storing, at the host, the updated disaster recovery failover policy in a storage unit.

12. The method of claim 11, further comprising:
retrieving from a storage unit, at each disaster recovery site upon receipt of the request, a preset list specifying the plurality of tests, the preset list including at least one first test;
performing, at each disaster recovery site, the at least one first test; and
calculating, at each disaster recovery site, a first value from the at least one first test performed,
wherein the calculated priority score transmitted from each disaster recovery site is based on the first value calculated at the respective disaster recovery site.

13. The method of claim 12, wherein the preset list includes a plurality of first tests and each disaster recovery site performs the plurality of first tests according to a first predetermined order.

14. The method of claim 13, wherein the plurality of first tests include at least one of determining connectivity of a storage unit of the disaster recovery site, determining consistency of data stored in the storage unit at the disaster recovery site, determining whether the data stored in the storage unit at the disaster recovery site is current, and determining an overall health of the disaster recovery site, the overall health including resource availability.

15. The method of claim 13, further comprising:
determining, at each disaster recovery site, whether the preset list further includes at least one second test;
performing, at each disaster recovery site, the at least one second test when it is determined that the preset list includes the at least one second test; and
calculating, at each disaster recovery site, a second value from each second test performed,
wherein the calculated priority score is modified based on the second value calculated.

16. The method of claim 15, wherein the priority score is calculated by weighting each first value.

17. The method of claim 15, wherein the preset list includes a plurality of second tests and each disaster recovery site performs the plurality of second tests according to a second predetermined order.

18. The method of claim 17, wherein the plurality of second tests are set by the user via a user interface at each of the disaster recovery sites.

19. At least one non-transitory processor readable storage medium storing a computer program of instructions configured to be readable by at least one processor for instructing the at least one processor to execute a computer process for performing the method as recited in claim 1.

20. A system for managing a disaster recovery failover policy comprising:
one or more processors communicatively coupled to a network; wherein the one or more processors are configured to:
identify which of a plurality of disaster recovery sites are available for disaster recovery of host data;
determine a cluster configuration of each disaster recovery site identified as available for the disaster recovery of the host data independent of initiation of the disaster recovery of the host data;
perform a plurality of tests on each disaster recovery site identified independent of the initiation of the disaster recovery of the host data;
determine, at each disaster recovery site, whether one of the plurality of tests was unsuccessful;
calculate, at each disaster recovery site, a priority score based on the plurality of tests performed on each disaster recovery site;

transmit, from each disaster recovery site to a separate host, the priority score and, when it has been determined that the one of the tests was unsuccessful, an indication that the one of the plurality of tests was unsuccessful;
compare, at the host, the priority score received from each disaster recovery site;
rank, at the host, each of the disaster recovery sites based on the comparison of the priority scores; and
update automatically, at the host, the disaster recovery failover policy based on the identification of which of the plurality of disaster recovery sites are available for disaster recovery, the determined cluster configuration, and the ranking prior to a failover event occurring at a host.

* * * * *